Jan. 3, 1967  D. M. BAKER  3,295,404
COLLAR FOR HUCK FASTENER
Filed June 24, 1965
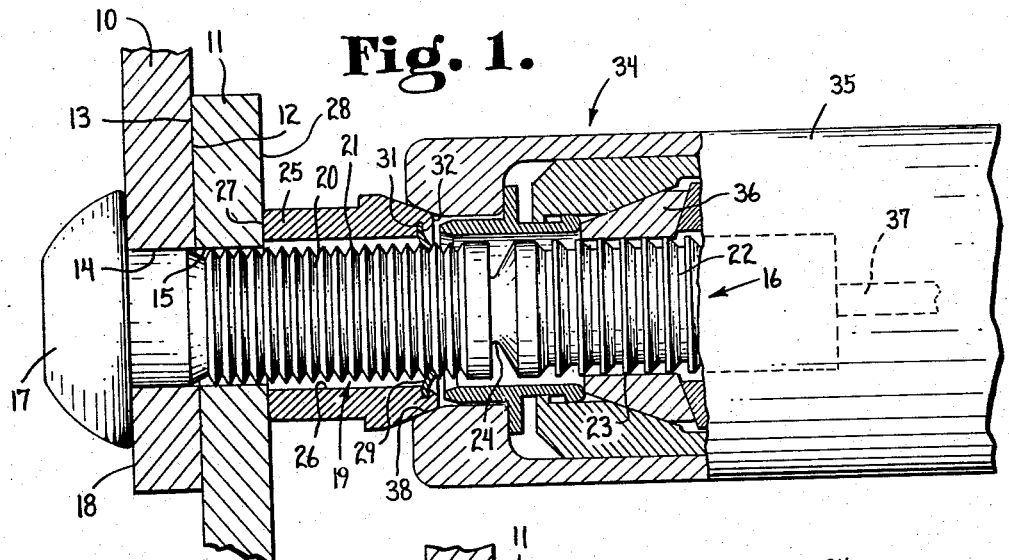
Fig. 1.
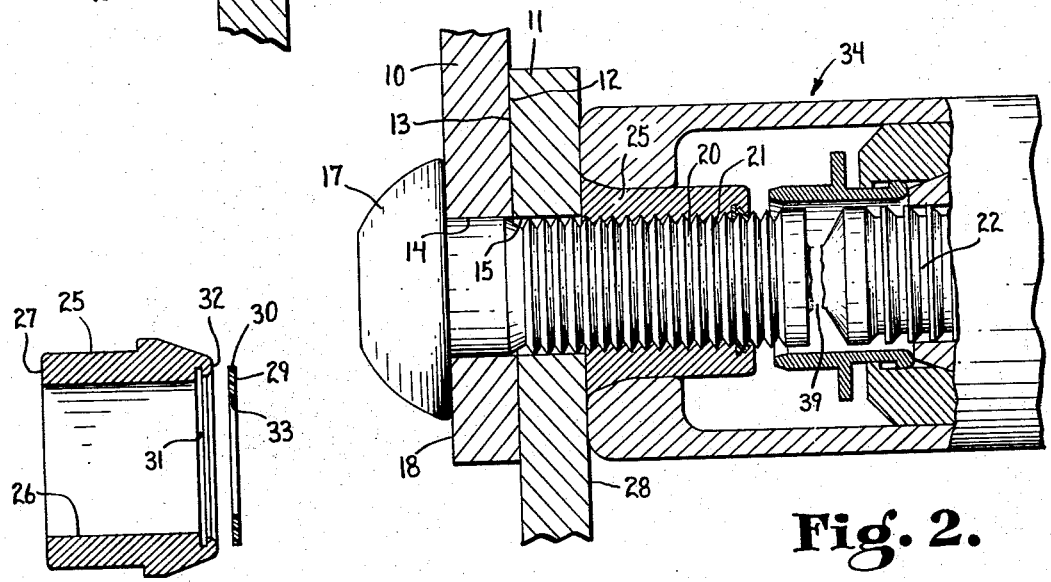
Fig. 2.
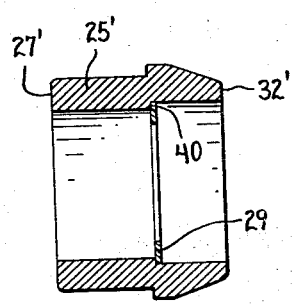
Fig. 3.
Fig. 4.
INVENTOR.
DYKES M. BAKER
BY
Hood, Gust & Irish
Attorneys

United States Patent Office 3,295,404
Patented Jan. 3, 1967

3,295,404
COLLAR FOR HUCK FASTENER
Dykes M. Baker, Marion County, Ind.
(254 S. Walcott St., Indianapolis, Ind. 46201)
Filed June 24, 1965, Ser. No. 466,529
1 Claim. (Cl. 85—7)

One well-known means for securing together two elements in facing abutment is the so-called "Huck" fastener. Such a fastener comprises a headed bolt having a shank adapted to penetrate registering apertures in abutting members. The shank comprises a proximal portion adapted to extend beyond the members to be secured and surface-roughened, preferably by means of circular, axially separated serrations, and further having a distal portion, separated from the proximal portion by a significantly-reduced neck, said distal portion being similarly surface-roughened, usually by heavier serrations. The bolt shank is inserted through the registering apertures until its head engages the remote surface of one of the members to be secured. A loosely-fitting collar of ductile metal is then sleeved onto the shank in facing association with the remote surface of the other member to be secured. Then, through the use of a tool which includes a chuck operable to grip firmly the roughened surface of the distal portion of the bolt, the collar is swaged into locking engagement with the roughened surface of the proximal shank section, while the collar is pressed firmly into engagement with the facing member surface. The tool continues to exert a tensile force on the distal shank section until the shank is broken at the above-mentioned neck.

The tool is of such character that the chuck cannot be engaged with the distal portion of the bolt shank until after a push rod within the tool has been forced rearwardly by engagement with the distal terminus of the bolt shank. Therefore, it is essential that the bolt head shall be bucked at the time when the tool is applied to the fastener; and in many instances and environments the bucking cannot be accomplished by the tool operator but requires the presence of a second worker.

The primary object of the present invention is to modify the conventional Huck fastener in such a way as to obviate the necessity for the bucking operation, thereby eliminating the need for an operator's helper.

Further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claim is not violated.

FIG. 1 is a sectional view of a Huck type fastener, modified in accordance with the present invention, assembled with fragments of elements to be secured together, with the conventional setting tool just ready to perform the swaging operation;

FIG. 2 is a similar view illustrating conditions after the collar has been swaged into final association with the bolt and after the bolt has been broken at the above-mentioned neck;

FIG. 3 is an exploded view of the preferred form of my improved collar before assembly of the restraining ring therewith; and FIG. 4 is a section through a modified form of improved collar.

Referring more particularly to FIGS. 1 to 3, it will be seen that I have suggested members 10 and 11 having face-abutting surfaces 12 and 13 respectively and formed with registering openings 14 and 15. A Huck type bolt indicated generally by the reference numeral 16 comprises a head 17 adapted to bear against the remote surface 18 of the member 10 and a shank 19 which comprises a proximal section 20 extending through and beyond the openings 14 and 15 and formed with an axially-spaced series of circular ridges or serrations 21. Said shank further comprises a distal section 22 formed with similar, but heavier, serrations 23; and the shank is intermediately formed with a significantly reduced, weakening neck 24.

A collar 25, basically similar to the conventional collar of a Huck fastener, comprises a tubular body whose bore 26 has a diameter only slightly exceeding the external diameter of the shank section 20 defined by the apices of the serrations 21. Said collar is loosely sleeved on the shank 19 and is pressed home manually until its inner end 27 abuts, or substantially abuts, the remote surface 28 of the member 11.

According to the present invention, a stiffly flexible ring 29 is interposed between the collar 25 and the shank 19 in such fashion as to cooperate with said collar and with said shank to resist relative movement between the shank and the collar in a direction separating the collar and the bolt head. In the preferred form of the invention, the collar 25 is formed, near its outer end 32, with recess means such as an internal peripheral groove 31 in which is retainingly seated the outer peripheral region 30 of the ring 29. The ring 29 may be made from any suitable, stiffly flexible and preferably resilient material and I prefer to use any one of the well-known sheet synthetic plastics having suitable physical characteristics. The internal diameter of the ring 29 is less than the external diameter of the shank 19 measured at the bases of the serrations 21 so that, as the collar 25 is sleeved onto the shank, the ring will be flexed in the manner clearly illustrated (perhaps with some exaggeration) in FIG. 1.

It will be apparent that one man may insert the bolt shank through the openings 14 and 15 and may thereafter sleeve the collar 25 onto the bolt shank without assistance, even if the members 10 and 11 are of such character that the operator must walk around them from one side to the other or, for some other reason, cannot have simultaneous access to both sides of the abutting members. Thus, the operator may manually hold the shank section 20 while starting the collar 25 onto the distal end of the shank section 22, and may then shift his grip to the shank section 22 as he advances the collar into its illustrated position on the shank section 20. Engagement of the inner peripheral region of the ring 29 with the serrations 21, however, will effectively restrain retrograde relative movement between the shank and the collar. Thus, once the end 27 of the collar 25 has been brought into abutment with the member surface 28 while the head 17 abuts the member surface 18, the ring 29 will maintain that relationship against significant forces applied against the shank 19 toward the left as viewed in FIG. 1 or against the collar 25 toward the right.

The Huck gun or tool is fragmentarily suggested at 34. It comprises a nose assembly 35 including a multi-part chuck 36 which will be activated into gripping engagement with the serrations 23 of the distal shank section 22 when a plunger 37 has been moved toward the right relative to the nose assembly by engagement with the distal end of the bolt 16. That action occurs substantially simultaneously with the engagement of a flared anvil surface 38 upon the outer end of the collar 25. Now, the tool is hydraulically actuated to produce movement of the anvil 38 toward the left relative to the chuck 36, whereby the nose assembly housing will be moved into engagement with the surface 28 as shown in FIG. 2, swaging the collar 25 into locking association with the serrations 21. After such engagement, continued actuation of the tool will apply a sufficient tensile force to the shank section 22 to break the shank at the neck 24 in the manner suggested at 39 in FIG. 2. Now, the tool may be disengaged from the collar 25 whereafter the section 22 or tailing will be discharged from the tool.

It will be apparent from the above description that the ring 29 holds the bolt 16 against movement to the left with sufficient tenacity to resist the axial force applied thereto by the plunger 37 as advancement of the tool to the position illustrated in FIG. 1 actuates said plunger. In the absence of such a ring or its equivalent, such resistance could be provided only by a second operator bucking the bolt head 17.

While the form of ring mounting illustrated in FIGS. 1 and 3 is preferable, it will be apparent that the ring might be arranged, instead, against a shoulder 40 in a collar 25', such shoulder constituting the base of recess means and facing the outer end 32' of the collar. With such an arrangement, the collar 25' would be sleeved onto the bolt shank and into abutment with the member surface 28, whereafter the ring 29 would be forced, by means of a suitable tool, along the length of the shank 19 and into bearing engagement with the shoulder 40 at the outer peripheral region of the ring. Insertion of the ring into the outer end of the bore of the collar 25' and into engagement with the shoulder 40 would cause a flexure of the ring similar to that illustrated in FIG. 1. It will be obvious that such flexure produces a toggle effect, intensifying the degree of resistance afforded by the ring against relative movement such as to separate the collar and the bolt head. However, some of the advantages of the present invention could be achieved through the use of a ring having an internal diameter precisely equal to the external diameter of the shank section 20 measured at the bases of the serrations 21.

I claim as my invention:

Fastener means for two members having face-abutting surfaces formed with registering openings therethrough, comprising a bolt including a shank penetrating said openings and an enlarged head, said shank having a portion provided with substantially annular ribs extending beyond the remote surface of one of said members when said head is in abutment with the remote surface of the other of said members, and a collar formed of a ductile metallic material proportioned and designed for swaging into locked association with said annularly ribbed shank portion, said collar having an axial bore to define a tubular body disposed on said shank portion and having an inner end engageable with said remote surface of said one member and having an outer end portion, the minimum diameter of said collar bore being greater than the maximum diameter of said shank portion, and a stiffly flexible ring mounted within recess means in said bore and restrained against relative axial movement toward said inner end of today tubular body, said ring projecting radially into said bore with the internal dimensions of said ring being slightly less than the corresponding external dimensions of said extending shank portion, whereby the radially inner periphery of said ring engages said annularly ribbed shank portion.

References Cited by the Examiner

UNITED STATES PATENTS

| | | |
|---|---|---|
| 1,049,765 | 1/1913 | Reed. |
| 2,521,567 | 9/1950 | Corrigan et al. _____ 85—5 |
| 2,531,048 | 11/1950 | Huck _____ 85—5 |
| 2,913,950 | 11/1959 | Tinnerman _____ 85—36 |

CARL W. TOMLIN, *Primary Examiner.*

R. S. BRITTS, *Assistant Examiner.*